Figure 1:
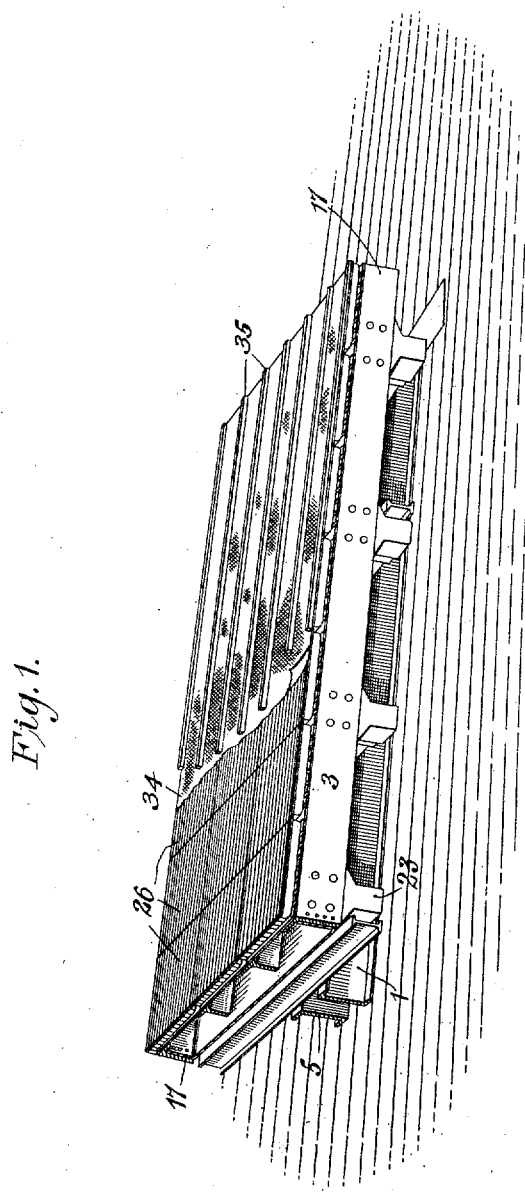
Figure 8:
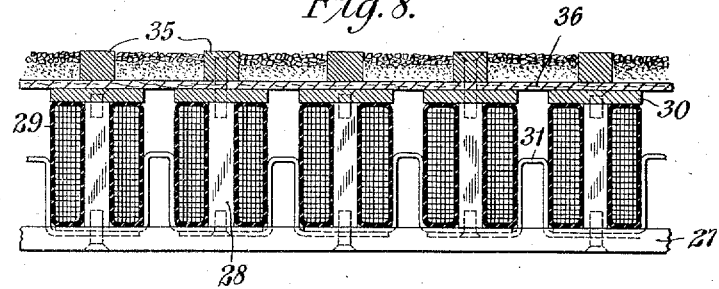
Figure 9:
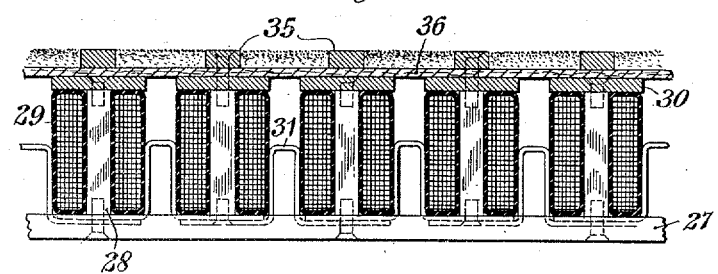

H. T. HERR.
CONCENTRATING DEVICE FOR MINERAL ORES.
APPLICATION FILED JUNE 25, 1907.

986,389.

Patented Mar. 7, 1911.
5 SHEETS—SHEET 1.

WITNESSES:
C. L. Belcher
R. J. Dearborn

INVENTOR
Herbert T. Herr
BY
Wiley G. Carr
ATTORNEY

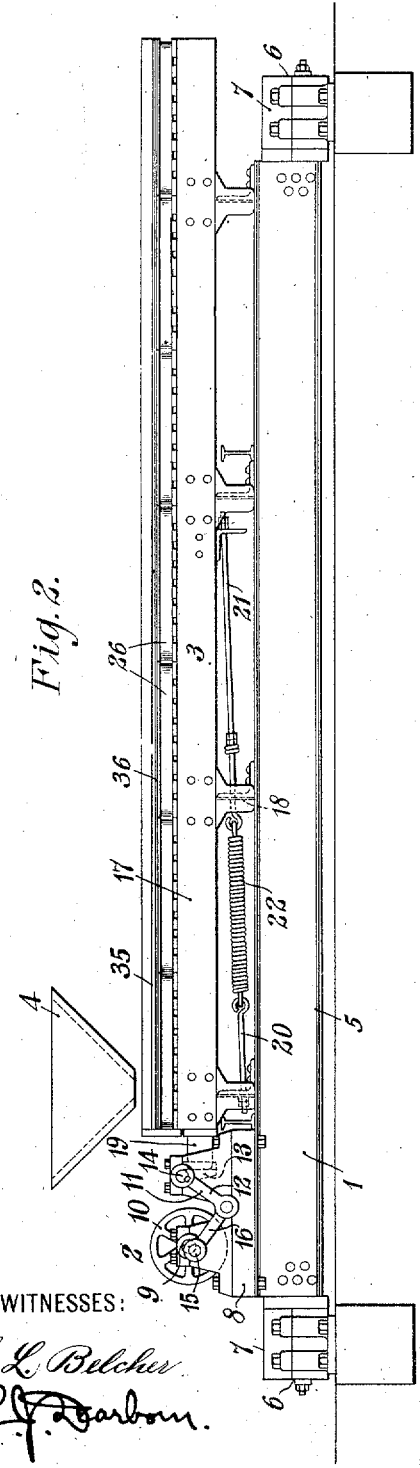
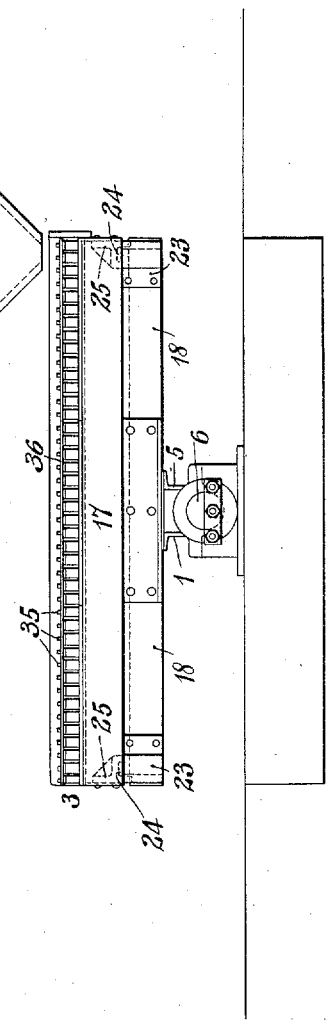

H. T. HERR.
CONCENTRATING DEVICE FOR MINERAL ORES.
APPLICATION FILED JUNE 25, 1907.
986,389.
Patented Mar. 7, 1911.
5 SHEETS—SHEET 3.
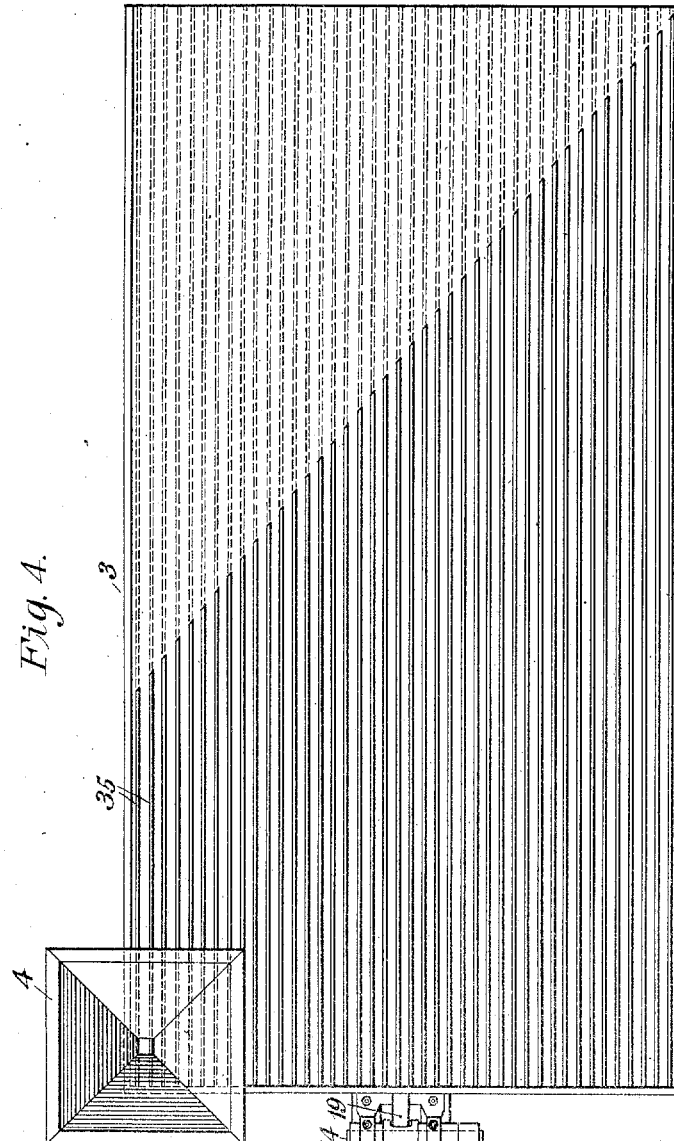
WITNESSES:
C. L. Belcher
R. J. Dearborn
INVENTOR
Herbert T. Herr
BY
Wesley G. Carr
ATTORNEY

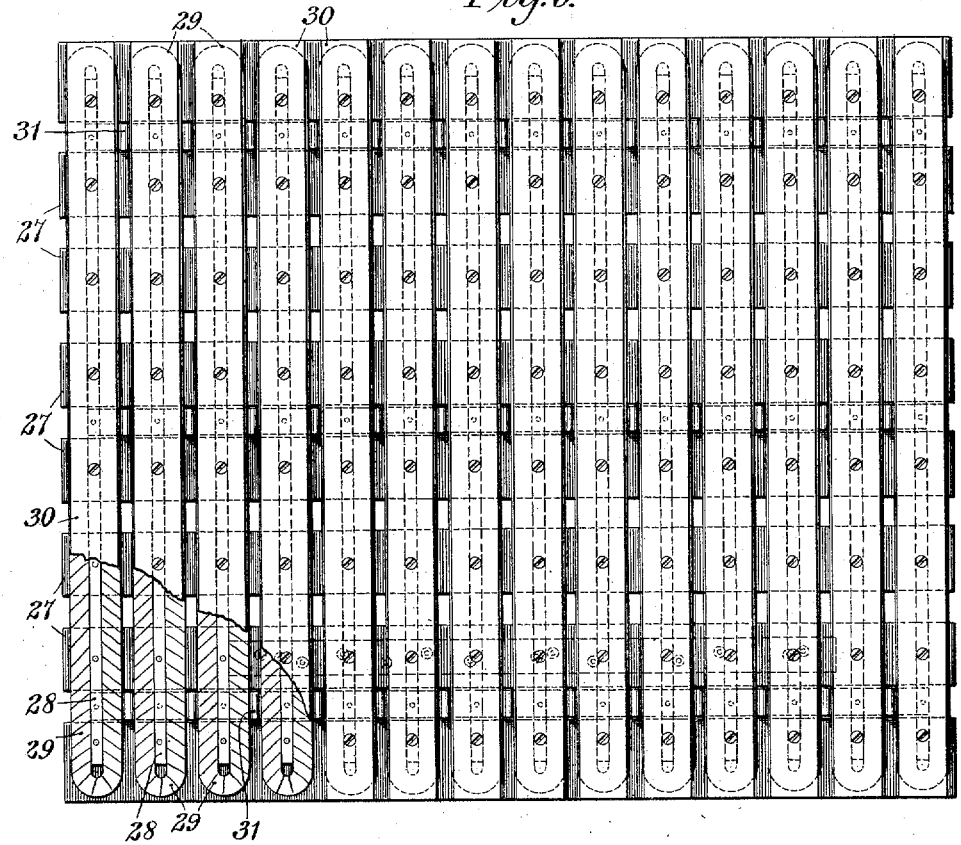
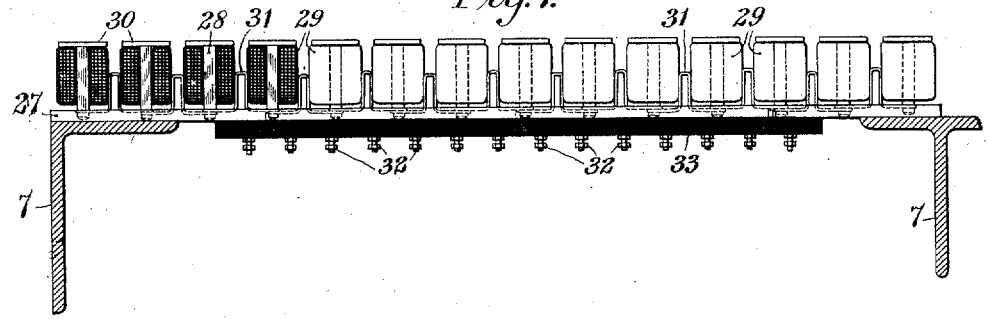

UNITED STATES PATENT OFFICE.

HERBERT T. HERR, OF DENVER, COLORADO, ASSIGNOR TO GEORGE WESTINGHOUSE, OF PITTSBURG, PENNSYLVANIA.

CONCENTRATING DEVICE FOR MINERAL ORES.

986,389.

Specification of Letters Patent.   Patented Mar. 7, 1911.

Application filed June 25, 1907.   Serial No. 380,801.

*To all whom it may concern:*

Be it known that I, HERBERT T. HERR, a citizen of the United States, and a resident of Denver, in the city and county of Denver and State of Colorado, have invented a new and useful Improvement in Concentrating Devices for Mineral Ores, of which the following is a specification.

My invention relates to means for separating minerals from vein rock or gangue with which it is usually mixed as it comes from the mine, and it has special reference to such devices as are commonly known as concentrating tables.

The object of my invention is to provide a device of the class above indicated that shall exceed in efficiency and reliability devices heretofore employed for the same purpose, and which shall provide the highest possible separation and concentration with a relatively small amount of power.

The concentrating tables of the prior art have often been employed for separating valuable minerals from refuse material and have generally comprised an inclined table to which an oscillatory motion was imparted, the crushed ore being fed through a hopper onto the table at its highest corner and the difference in the specific gravity between the particles of the ore being relied upon to produce the desired separation. In order to facilitate this separation, the top surfaces of the tables have usually been provided with strips or bars which were disposed in substantially parallel lines and in line with the oscillatory movement of the table. By making the lateral inclination of the table greater than its longitudinal inclination and by suitably regulating its longitudinal movement, the heavier portions of the ore gradually traveled toward the end of the table along the lines of the partitions, and the lighter material jumped over the barriers and fell off the side of the table.

It will be readily understood that unless considerable difference in the specific gravities of the useful and gangue materials existed, the concentration was relatively uncertain.

According to my present invention, I provide a concentrating device which is similar in general to the concentrating tables above described, but its efficiency and reliability are increased materially by a special arrangement of electromagnets whereby the surface of the table becomes uniformly attractive to such particles of the ore as are magnetizable, even to the slightest degree. By this means, a separation is obtained between particles differing only slightly in specific gravity which is comparable with the separation which has ordinarily been obtained when a material difference in specific gravity existed; in other words, the specific gravity of the magnetizable particles of ore is virtually increased.

Figure 1 of the accompanying drawings is a perspective view of a concentrating table constructed in accordance with my invention, the surface of the table being adapted for a dry process in which air is forced through a fine screen over which the ore passes. Figs. 2, 3, and 4 are, respectively, a side and an end elevation and a plan view of a concentrating table which is also constructed in accordance with my invention, but which is adapted for practicing a wet process in which the ore is mixed with water before it is passed onto the surface of the table. Figs. 5, 6, 7, 8, 9, and 10 are detail views of the tables shown in Figs. 1, 2, 3, and 4.

Referring to the drawings, in which corresponding parts are designated by the same reference characters, the concentrating device here illustrated comprises a rotatably adjustable supporting structure 1, a reciprocating mechanism 2, a table 3, and a hopper 4.

The supporting structure 1 may be of any suitable design, and, as shown, comprises a pair of channel beams 5 and shaft projections 6 which support the beams and are firmly secured to their ends. The shaft projections are rotatably supported in stationary bearings 7 which are so arranged as to clamp the structure 1 in position after the rotatable adjustment of this part has been effected.

The oscillating mechanism 2 is secured to one end of the supporting structure 1, and comprises a bearing block 8, a driving shaft 9 to which a pulley 10 is attached, and an oscillating lever 11, which consists of two arms 12 and 13 that are keyed to a shaft 14. The arm 12 is actuated by means of a connecting rod 16 which is attached to an eccentric projection 15 on the shaft 9.

A rigid frame or box 17, which forms a part of the table 3, is adjustably mounted on a plurality of cross bars 18, secured to the channel beams 5, and is provided with a buffer 19 which engages the oscillating arm 13. The buffer is held in engagement with the oscillating arms 13 by rods 20 and 21 that are respectively attached to the structure 1 and the table 3 and are connected by a helical spring 22, for which any other suitable resilient connection may be substituted. In order to confine the adjustment of the table relative to the supporting structure 1 to a longitudinal movement, supporting blocks or castings 23 having projections 24 are secured to the extremities of the cross bars 18, and angle irons 25 are so attached to the sides of the rectangular frame or box 17 as to rest upon the blocks 23, the adjacent surfaces of the angle irons being grooved to receive the projections 24. It is necessary that guideways of some sort be provided in order to maintain the proper relation between the table and its supporting structure, when the latter is tilted, as hereinafter pointed out.

In order that the surface of the table may be made attractive to magnetizable particles, a plurality of coil sections 26 are provided which are substantially square and are fitted together to form a series of slats or flat bars which constitute the surface of the table proper and upon which a screen or a covering of fabric may be spread, according as a dry or a wet method is to be practiced.

One of the sections 26 is illustrated in plan and elevation in Figs. 6 and 7, to which special reference may now be had, and comprises a plurality of magnetizable crossbars or strips 27, which serve to space and support a series of magnetizable-core members 28, about which a plurality of long flat coils 29 are wound. The coils are held in position by a series of thin strips 30, which are secured to the core members 28 and are of substantially the same width as the coils 29 and parallel to each other. These strips are separated by relatively narrow spaces and lie substantially in one plane, so that they form the surface of the concentrating table.

In order to prevent the coils from bulging in the center, spacing members 31, comprising loops of resilient strap jointed together, are forced into the spaces between the coils, from below, and are secured to the core members 28. The conducting leads of the coils are connected to a plurality of terminals 32 that are mounted on an insulating strip 33, so that the electrical connections of the coils may be varied to produce the proper magnetism of the table surface.

Figure 10:
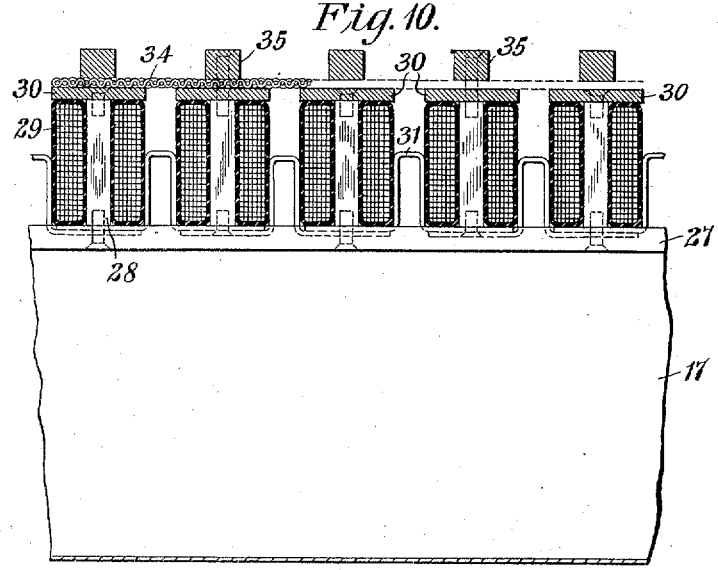

Special reference may now be had to Figs. 1 and 10, in which the surface of the concentrating table is adapted for a so-called dry process in which dry particles of crushed ore are fed through the hopper onto the surface of the table, for concentration. In this process, a screen 34 of some closely woven fabric is spread over the slats 30, and longitudinal strips 35, are provided above the screen to serve as partitions or barriers to hinder the heavier particles from passing over the side of the table. As illustrated in Fig. 1, the frame or box 17 is preferably closed at the bottom and sides and is supplied with air under pressure which is thus forced between the coils 29 and through the screen 34. The strips 35 are preferably tapered from the higher end of the table to the lower end in order to increase the efficiency of the separation as the particles of ore approach the end of the table.

In order to adapt the surface of the table for what is known as the wet process, in which the crushed ore is mixed with water before it is passed through the hopper onto the surface of the table, a structure such as that shown in Figs. 2, 3, 4, 8, and 9 may be employed. As here shown, a waterproof film or sheet 36, such as linoleum, is spread over the slats 30, the tapered strips or barriers 35 being secured in position on top of the film or sheet.

The operation of the device is as follows: Assuming that the table has been given a suitable longitudinal and lateral inclination and that an oscillatory movement is imparted to it by the mechanism 2; particles of ore, either dry or mixed with water; as the case may be, are fed through the hopper 4 onto the highest corner of the table, the surface of which is magnetized by the energizing of the coils 29. The specific gravity of the waste material is usually less than that of the metallic ore, and, furthermore, the useful particles are usually attracted by magnetic force to a greater extent than are the waste particles. Assuming that ore having such properties has been fed onto the table, the motion of the latter will cause the lighter particles to jump over the barriers and eventually pass off of the table at the side, while the heavier and useful particles the specific gravity of which has been virtually increased by the magnetic attraction of the table, are constrained to pass along the channels formed by the partitions or barriers 35, to the end of the table. In this way the desired separation is effected.

In some cases, it may be desirable to make the barriers 35 of varying lengths, as shown in Fig. 4, and the distances between these barriers as well as their form and arrangement may be varied to suit existing conditions.

It is conceivable that various structural modifications may be effected in the concentrating device without departing from the spirit of my invention, and I desire that only such limitations be imposed as are indicated in the appended claims.

I claim as my invention:

1. In a concentrating device for ore, the combination with a rotatably adjustable supporting frame, a table comprising a plurality of flat magnetizable bars or strips slightly separated from each other, magnetizable webs attached to the flat bars or strips, cross-rods attached to the opposite sides of the webs for spacing the bars, and magnet coils fitted onto the webs between the bars and the cross-rods, said table being adjustably mounted on the supporting frame, and means for imparting an oscillatory motion to the table.

2. In a concentrating device for ore, the combination with a plurality of parallel core members of magnetizable material and spaced strips mounted thereon in a single plane, of long flat coils surrounding the core members from end to end, and spacing members for said coils comprising loops of a resilient strap forced into the spaces between adjacent coils.

3. In a concentrating device for ore, a rotatably adjustable supporting frame and a table mounted on said frame and comprising a plurality of flat magnetizable strips spaced apart with open spaces between the strips, magnetizable webs secured to the strips, cross-bars attached to the opposite sides of the webs for spacing the strips, magnetic coils fitted onto the webs between said strips and said bars, and a screen mounted on said strips.

4. In a concentrating device for ore, a rotatably adjustable supporting frame and a table mounted on said frame and comprising a plurality of flat magnetizable strips spaced apart, webs attached to the strips and cross rods attached to the webs for spacing the strips, magnetic coils fitted onto said webs between said strips and said rods, a screen mounted on said strips, and tapered barrier strips mounted on said screen.

5. In a concentrating device for ore, a plurality of parallel strips, magnetic coils secured to said strips, spacing members for said coils comprising loops of a resilient strap forced into the spaces between said coils, a screen secured to said strips, and barrier strips located on said screen.

6. In a concentrating device for ore, a rotatably adjustable support frame, a table comprising a plurality of flat metal strips spaced apart, a magnetic coil, substantially the length and width of a strip, secured to each strip, spacing members for securing said coils and said strips in place, a screen located on said strips, and barrier strips located on said screen.

7. In a concentrating device for ore, an adjustable support frame, a table comprising a plurality of parallel metal strips spaced apart, a magnetic coil, substantially the length and width of a strip, secured to each strip, spacing bars for securing said coils and said strips in place, spacing members for said coils comprising loops of a resilient strap forced into the spaces between adjacent coils, and electric connections for said coils located beneath said table.

8. In a concentrating device for ore, an adjustable supporting frame, a table comprising a plurality of parallel metal strips, magnetic coils secured to said strips, spacing rods for securing said coils and said strips in place, spacing members located between adjacent coils, a screen secured to said strips above said coils, barrier strips mounted on said screen, and electric connections for said coils located between said tables.

9. In a concentrating device for ore, an adjustable support frame and a table comprising parallel metal strips spaced apart, a magnetic coil, substantially the length and width of a strip, secured to each strip, a screen located on said strips above said coils, barrier strips located on said screen, and electrical connections for said coils located beneath said table.

In testimony whereof, I have hereunto subscribed my name this 7th day of June, 1907.

HERBERT T. HERR.

Witnesses:
WESLEY G. CARR,
BIRNEY HINES.